Sept. 11, 1923.					1,467,676
S. LAKE
CONCRETE STORAGE PLANT, REFRIGERATOR, AND THE LIKE
Filed Aug. 12, 1918			2 Sheets-Sheet 1
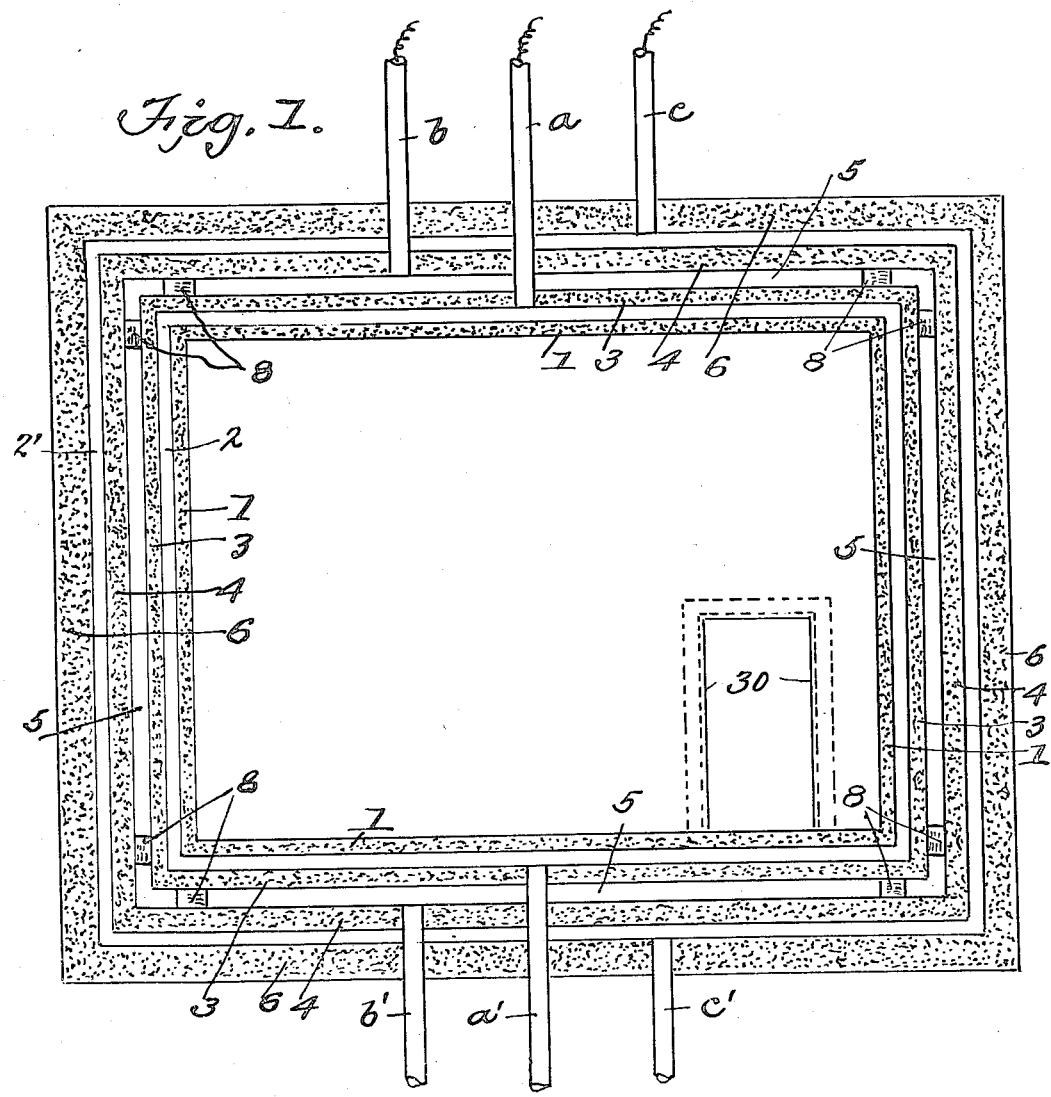

Sept. 11, 1923. 1,467,676
S. LAKE
CONCRETE STORAGE PLANT, REFRIGERATOR, AND THE LIKE
Filed Aug. 12, 1918  2 Sheets-Sheet 2
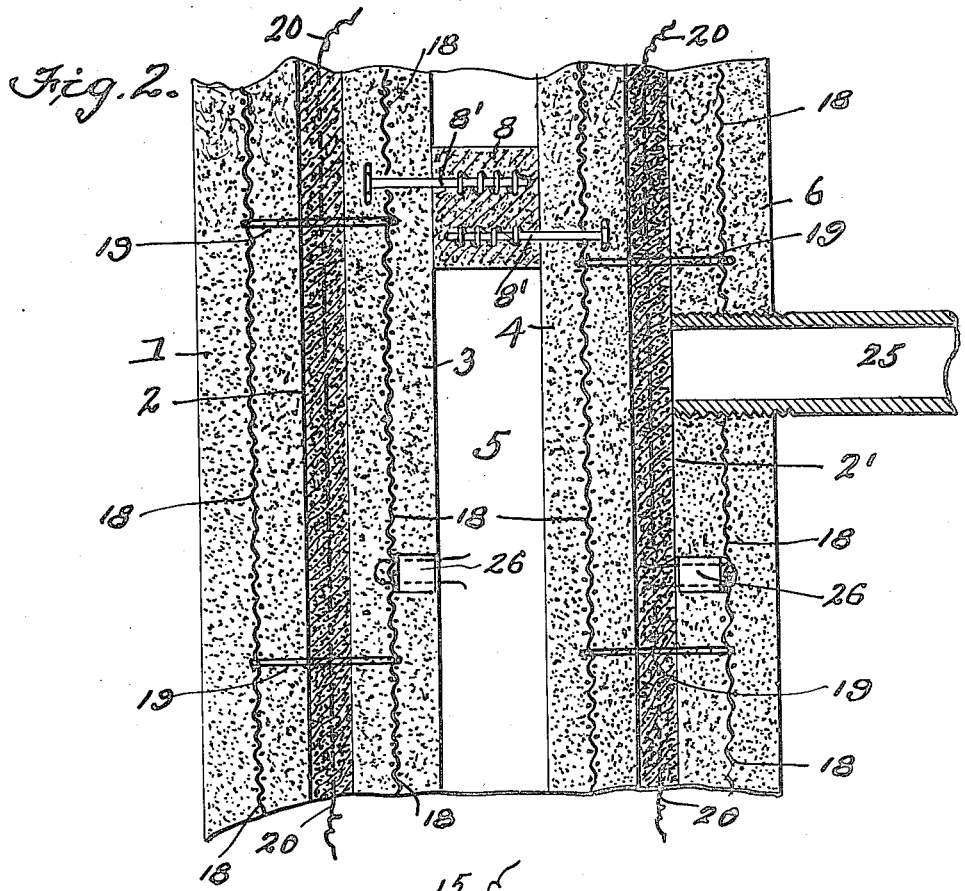
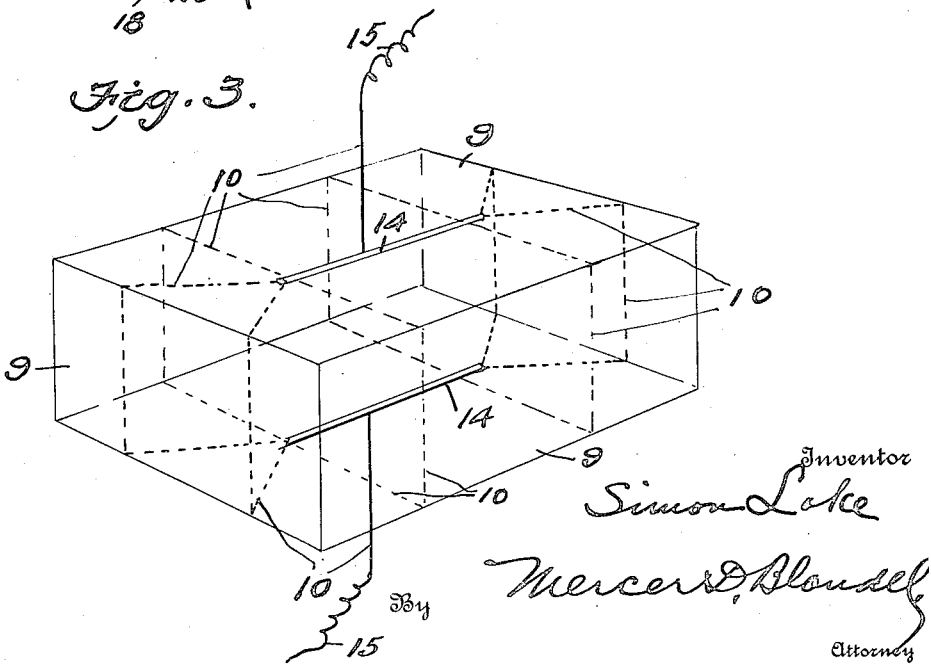
Inventor
Simon Lake
By Mercer D. Blondel
Attorney Patented Sept. 11, 1923.

1,467,676

UNITED STATES PATENT OFFICE.

SIMON LAKE, OF MILFORD, CONNECTICUT.

CONCRETE STORAGE PLANT, REFRIGERATOR, AND THE LIKE.

Application filed August 12, 1918. Serial No. 249,474.

*To all whom it may concern:*

Be it known that I, SIMON LAKE, a citizen of the United States, residing at Milford, in the county of New Haven and State of Connecticut, have invented certain new and useful Improvements in Concrete Storage Plants, Refrigerators, and the like, of which the following is a specification.

The invention relates to improvements in concrete building constructions, such as are employed in connection with cold storage plants, tanks, vaults, cold storage transportation cars and ships. It is well known that foodstuffs decay very rapidly unless kept in cold storage, especially when such food-stuffs are transported from tropical regions into colder climes. It is also well known that certain volatile liquids cannot be held in steel tanks or tanks of concrete construction without great loss due to evaporation and the seepage of the material through the walls of the apparatus. It is also well known that air-tight walls are essential to the proper conservation of heat and cold in order to retain the temperature within the compartment to which the articles stored therein are originally subjected, and that the spaces between the walls of a vessel, when subjected to a partial vacuum, afford a high degree of insulation.

In accordance with my present application, I purpose to construct buildings and marine vessels of relatively large dimensions wherein to secure the highest degree of insulation first by treating the walls of the structure with suitable insulating material, and second by providing compartments within the walls of the structure whereby a partial vacuum may be created, so that not only are the walls made impervious to moisture and to seepage of the material contained within the structure or tanks, but also impervious to heat or cold, both in the transportation of perishable articles through zones of varying climatic temperatures, and also in the transporation of volatile liquids, especially when such liquids are subjected to expansion and contraction due to changes of temperatures.

In carrying out my invention, I purpose to use reinforced concrete, combined with a filling of insulating material which is arranged within the spaces between the inner and outer walls of the structure, and to so construct the inner and outer walls as to provide an air space which may be subjected to a partial vacuum to thus serve as an additional insulating medium between the inner and outer walls of the structure.

The invention comprises certain novel features of construction, combinations and arrangements of parts as will be hereinafter fully described and then pointed out in the claims.

In the drawings, illustrating the invention, in the several figures of which like parts are similarly designated, Figure 1 is a diagrammatic cross-sectional elevation of a building, which may represent a refrigerator tank or room or a part of a cold storage plant. Fig. 2 is an enlarged detail section of a portion of the walls of a building or room. Fig. 3 is a detail diagrammatic perspective view of one of the fusible blocks around which the walls of the structure are formed.

Referring to Fig. 1 of the drawings, the numerals 1, 3, 4, and 6, designates the walls of the structure. The walls of the structure are designed to be constructed of concrete, and to be insulated from one another by means of suitable materials such as cork and tar, or cork and glue, or cork and paraffin, or any other suitable materials that will readily harden and adhere to the walls of the structure. Between the walls 1 and 3 there is arranged a chamber 2, designed to contain the insulating material as above specified, and which will be hereinafter more specifically referred to. Between the walls 4 and 6 there is also arranged a chamber 2', designed to be filled with suitable insulating material.

Between the walls 3 and 4 there is formed a space 5, designed to form a vacuum chamber between the double sets of walls 1 and 3 and 4 and 6, and this chamber is preferably formed by the use of a fusible mould, such as paraffin and cork, made up in the form of sheets or slabs having suitable electric conducting wires embedded therein so that the fusible material may be melted and caused to run off when current is conducted through the wires. The chamber 5, when the material is run off therefrom serves to provide a vacuum compartment between the inner and outer walls of the structure, so that the several walls are more or less insulated from each other. The walls 3 and 4 are braced by suitable interposed spacing pieces 8, see for illustration Fig. 1. The spaces 2 and 2' between the walls 1 and 3 and 4 and 6, respectively, are filled with a material, which may vary in accordance with the use to which the structure is intended to be employed; for instance, should the compartments of the structure be used for the storage of foodstuffs, the spaces 2 and 2' will be filled with a mixture of cork and paraffin, and the spaces 2 and 2' so impregnated that seepage will be rendered practically impossible. If my structure were intended for the storage of volatile liquids, such as gasoline, kerosene, or like liquids, I would use a mixture composed of ground cork and glue instead of a mixture of cork and paraffin.

If the structure is to be used for the storage or transportation of food-stuffs, I use a mixture of ground cork and paraffin because such a composition is perfectly tasteless and non-injurious to food products. In case of a vessel for the storing or for the transportation of volatile liquids, I use a mixture composed of ground cork and glue, or a compound of which the body is insoluble when set, and which will not be affected or made soluble by exposure to fumes.

In constructing a building in accordance with my invention, I erect a suitable framework (not shown), which forms a mould for the inner sides of the walls 1 of the structure, and then arrange a framework at suitable distance from the first mentioned framework so that when the concrete is poured between the frames or moulds and allowed to set, the frames may be removed and again set up so as to form a mould for the walls 3. This operation is repeated with respect to the erection of the walls 4 and 6. After the walls are set, the insulating mixture is then poured into the chambers 2 and 2', it being understood that this mixture is poured into the said spaces while in a plastic state so that the same may be caused to run into any cracks or crevices that may accrue through the setting of the walls. Before the framework of the walls 4 is set up, I arrange upon the outer side of the walls 3, a series of sheets or slabs 9 of paraffin or a composition of paraffin and ground cork. These sheets or slabs may be constructed of various thicknesses according to the space desired between the walls 3 and 4. Moulded in the sheets or slabs 9 are electric conducting wires 10, which are suitably connected to the wires of the adjacent slabs whereby, when current is supplied any one set of wires, the wires of all the slabs will be energized so as to heat and melt the substance of which the slabs are composed and cause the same to flow from the space 5, thereby providing the vacuum chamber between the walls of the structure as hereinbefore mentioned. It will, of course, be understood that I make no specific claim as to the particular method of forming the walls of the structure per se, since it will be obvious that various forms of moulds may be employed and that other methods than pouring the concrete into moulds may be adopted without departing from the broad idea of my invention.

The spacers 8 are interposed between the walls 3 and 4. These spacers may be of wood or other suitable material having the anchor rods 8' embedded therein, (see Fig. 2) which extend beyond the ends of the spacing members and have heads which are moulded in the walls 3 and 4 to thus tie the walls together, so that they will be firmly locked after the fusible sheets or slabs 9 are removed. While in Fig. 1 I show these spacing members only at the angular corners of the channel 5, it will, of course, be understood that they may be arranged throughout the structure at the discretion of the builder as indicated in Fig. 2.

Filling pipes $a$, $b$, and $c$, are introduced respectively into the spaces between the several walls of the structure and are molded in the walls as they are formed, so as to facilitate the filling of the spaces 2 and 2', and also, to afford leaders for the wires connecting the fusible slabs 9. Drain pipes $a'$, $b'$, and $c'$, are provided for carrying off the fused materials, it being understood that the drain pipes will be provided with suitable valves so as to check the drainage of the materials when pumped into the various compartments of the structure.

While I have shown the sheets or slabs 9 provided with a certain peculiar arrangement of fusing wires, it will be understood that the invention is not so limited. In Fig. 3 there is shown a wiring diagram in which 14 denotes bus bars having leads extending therefrom and current wires 15 connected thereto, which are designed to be connected in suitable manner to the bus bars of the sheets or slabs arranged above and below each other, the arrangement being such that connections may be easily made to insure a complete circuit through the entire structure, so as to fuse the blocks and hence cause the material to flow from the chamber 5.

As shown in Fig. 2 the walls 1, 3, 4, and 6, may be strengthened by wire netting 18 and, if desired, suitable cross bars 19 may be provided in order to securely tie the walls together.

From the foregoing it will be seen that I provide a construction which is applicable both to land buildings and to concrete barges, and other vessels, and which will be impervious to moisture. prevent seepage of volatile liquids, and effect the preservation of foodstuffs when carried from one section of a country to another section of varying temperatures.

It will be appreciated that after the insulating materials have been poured into the spaces 2 and 2', such materials may be fused and caused to run into any cracks or crevices that may be occasioned in the setting of the walls of the structure, and furthermore, that through the fusion of the paraffin slabs 9, the material thereof will adhere to the walls and thus coat the walls so as to further render the structure moisture proof.

After the materials in the spaces 2 and 2' have set and the major portion of the fusible slabs 9 has been drawn off, the pipe $b'$ is cut off or closed by any suitable means and the pipe $b$ is connected with any suitable means by which the air in the space 5 is then withdrawn so as to create a partial vacuum in the space or chamber. The pipe $b$ is then sealed in a suitable manner, hence retaining a partial vacuum in the chamber.

It will be further understood that I may, as shown in Fig. 2 of the drawings, arrange an electric conducting wire 20 within the spaces 2 and 2' whereby to fuse the material after it has been poured into the said spaces so that thorough fusing of the material may be insured to cause it to run into the cracks or crevices in the several walls of the structure. Also, in Fig. 2 of the drawings, I show an outlet 25 which may extend through the outer walls 1 and 6 of the building, whereby to facilitate the outflow of the several compositions that may be employed in the construction of the structure.

I also illustrate in Fig. 2 of the drawings, an arrangement whereby I may employ anchor blocks 26 of any usual or approved construction adapted to tie the wire netting 18 to the insulating materials between the inner and outer walls of the structure.

For the purpose of illustration, I show in Fig. 1, a doorway 30, which is designed to be closed by an air-tight door such as employed in refrigerator plants. It will be understood, also that the structure may be provided with partitions and floors so as to subdivide it into various compartments.

While I prefer to employ the vacuum chamber 5, it may be dispensed with in some instances.

As already stated the insulating material between walls may be fused so as to run into and fill cracks or crevices in the walls incident to construction and such material may be re-fused to fill in cracks due to injury after the structure is in use.

While I have described my invention as being applicable to storage plants, refrigerating cars, ships, and the like, it will be appreciated that with very slight minor details of construction, the invention will also be applicable to small storage apparatus, such as refrigerators and like plants employed for household purposes. It will also be appreciated that when the apparatus is embodied in refrigerators for household purposes, minor details of construction such as the tie bolts and rods may be dispensed with. However, the principle of the vacuum chamber and the insulation of the walls of the structure will be adhered to.

What I claim is:—

1. A concrete conservation structure having an outside double wall and an inside double wall, and means interconnecting these two double walls, the spaces within these double walls containing an insulating compound of cork and a fusible binder adapted to render said double walls impervious.

2. A concrete conservation structure having an outside double wall and an inside double wall rendered impervious to air and moisture and spaced apart, and interconnecting means for the outer and inner double walls arranged in the separating space and serving to maintain said space.

3. A concrete conservation structure having an outside double wall and an inside double wall rendered impervious to air and moisture and spaced apart, and interconnecting means for the outer and inner double walls arranged in the space separating them and serving to maintain said space, the space separating the outer and inner walls adapted to be exhausted of air and so converted into a vacuum chamber.

4. A concrete conservation structure having outer double walls rendered air and waterproof and inner double walls likewise rendered air and waterproof, and a vacuum chamber interposed between the outer and inner walls.

5. A concrete structure composed of inner walls spaced apart and outer walls also spaced apart, said inner walls spaced apart from said outer walls, and separate inlets and outlets to the surrounding atmosphere opening into said several spaces whereby a fusible waterproofing material may be introduced into the several spaces and any surplus discharged therefrom.

6. A concrete conservation structure having outer hollow walls and inner hollow walls having their hollow interiors rendered air and waterproof, said inner walls and outer walls spaced apart and insulated from each other.

In testimony whereof I have hereunto set my hand this 8th day of August, A. D. 1918.

SIMON LAKE.

Witnesses:
C. E. ADAMS,
M. E. HITCHCOCK.